US010286946B2

(12) United States Patent
Nishimura

(10) Patent No.: US 10,286,946 B2
(45) Date of Patent: May 14, 2019

(54) STEERING CONTROL SYSTEM

(71) Applicant: JTEKT CORPORATION, Osaka-shi, Osaka (JP)

(72) Inventor: Akihiko Nishimura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 33 days.

(21) Appl. No.: 15/441,840

(22) Filed: Feb. 24, 2017

(65) Prior Publication Data

US 2017/0253265 A1   Sep. 7, 2017

(30) Foreign Application Priority Data

Mar. 4, 2016 (JP) .................................. 2016-042154

(51) Int. Cl.
*B62D 5/04* (2006.01)
*B62D 6/00* (2006.01)
(Continued)

(52) U.S. Cl.
CPC ........... *B62D 5/0463* (2013.01); *B62D 6/002* (2013.01); *B62D 6/008* (2013.01); *B62D 7/159* (2013.01); *B62D 15/025* (2013.01); *B62D 5/04* (2013.01); *B62D 5/046* (2013.01); *B62D 5/0457* (2013.01); *B62D 7/15* (2013.01)

(58) Field of Classification Search
CPC ...... B62D 5/0463; B62D 6/002; B62D 5/046; B62D 5/0457; B62D 5/04; B62D 15/025; B62D 7/159; B62D 6/008
See application file for complete search history.

(56) References Cited

U.S. PATENT DOCUMENTS

| 2014/0058628 | A1  | 2/2014  | Tamaizumi |              |
|--------------|-----|---------|-----------|--------------|
| 2015/0057889 | A1* | 2/2015  | Tamaizumi | B62D 5/0472  |
|              |     |         |           | 701/41       |
| 2015/0329140 | A1* | 11/2015 | Tamaizumi | B62D 6/003   |
|              |     |         |           | 701/42       |

FOREIGN PATENT DOCUMENTS

| EP | 2 842 833 A2   | 3/2015 |
|----|----------------|--------|
| EP | 2 842 839 A2   | 3/2015 |
| JP | 2014-040178 A  | 3/2014 |

OTHER PUBLICATIONS

Jul. 12, 2017 Extended European Search Report issued in European Patent Application No. 17158144.0.

* cited by examiner

*Primary Examiner* — Jerrah Edwards
*Assistant Examiner* — Mathew Franklin Gordon
(74) *Attorney, Agent, or Firm* — Oliff PLC

(57) ABSTRACT

A steering control system with which a steering angle accurately follows a steering angle command value is provided. An assist command value calculation circuit calculates a first assist component based on a value obtained by adding a basic assist controlled variable with a system stabilization controlled variable. The assist command value calculation circuit includes a pinion angle feedback control circuit that calculates a second assist component by executing angle feedback control based on a deviation between a pinion angle and a final pinion angle command value that is the sum of a pinion angle command value and an ADAS command angle. The assist command value calculation circuit outputs an assist command value based on the first assist component and the second assist component. The assist command value calculation circuit receives a steering torque obtained after the influence of viscosity and inertia is reduced by a steering torque compensation circuit.

7 Claims, 7 Drawing Sheets

(51) Int. Cl.
*B62D 7/15* (2006.01)
*B62D 15/02* (2006.01)

STEERING CONTROL SYSTEM

INCORPORATION BY REFERENCE

The disclosure of Japanese Patent Application No. 2016-042154 filed on Mar. 4, 2016 including the specification, drawings and abstract, is incorporated herein by reference in its entirety.

BACKGROUND OF THE INVENTION

1. Field of the Invention

The invention relates to a steering control system.

2. Description of the Related Art

There are known electric power steering systems (EPS) that assist a driver's steering operation by applying motive power generated by a motor to a steering mechanism of a vehicle. An electric power steering system (EPS) described in, for example, Japanese Patent Application Publication No. 2014-40178 (JP 2014-40178 A) calculates a controlled variable associated with driver's steering, based on a steering torque generated through the driver's steering.

Recent vehicles are equipped with systems for assisting a driver's operation, such as advanced driver assistance systems (ADAS). Some electric power steering systems (EPS) mounted in such vehicles control a motor based on a controlled variable associated with driver's steering and a controlled variable calculated based on an environment surrounding a host vehicle, which is measured by a measuring apparatus, such as a camera or a radar, in order to improve a driver's steering feel and to provide advanced driver assistance.

When the steering angle of a steering mechanism is varied through driver assistance, a torsion bar is twisted due to viscosity and inertia of a steering wheel. Consequently, a steering torque unassociated with the driver's steering is detected. Therefore, when the EPS calculates a controlled variable associated with the driver's steering, the EPS takes into account a steering torque generated through the driver assistance in addition to a steering torque generated through the driver's steering. The controlled variable associated with the driver's steering and the controlled variable associated with the driver assistance interfere with each other, and the follow-up accuracy with which the steering angle follows a steering angle command value may be reduced accordingly.

SUMMARY OF THE INVENTION

An object of the invention is to provide a steering control system that maintains a sufficient follow-up accuracy with which a steering angle follows a steering angle command value.

An aspect of the invention relates to a steering control system configured to control a motor that assists or performs steering of a steering mechanism. The steering control system includes: a first calculation circuit that calculates a basic component of an assist force based on a torque signal detected based on torsion between an input side of a steering shaft and an output side of the steering shaft; a second calculation circuit that calculates a compensation component for the basic component, by calculating, based on the torque signal, a rotation angle command value for a rotary shaft and then calculating, based on the rotation angle command value and a second command value, a final rotation angle command value and then executing angle feedback control based on the final rotation angle command value, the rotation angle command value being convertible into a steered angle of steered wheels, the second command value being externally generated for driver assistance based on information about an environment surrounding a host vehicle; a first command value generation adder that calculates a first command value by adding the compensation component to the basic component; and a torque signal correction circuit that corrects the torque signal used to calculate the compensation component by increasing or decreasing the torque signal when the second command value is reflected in the compensation component.

With this configuration, upon reception of the second command value, the torque signal correction circuit increases or decreases the torque signal such that that the first calculation circuit and the second calculation circuit execute calculation based on the corrected torque signal. Thus, even when driver assistance is executed based on the second command value, it is possible to reduce the influence on the follow-up accuracy with which a rotation angle follows a rotation angle command value. The influence is caused due to generation of a torque signal resulting from a variation in the steering angle of a rotary shaft of a steering mechanism. Thus, the first command value is calculated based only on the torque signal (steering torque) associated with the driver's operation. Therefore, the follow-up accuracy with which the rotation angle follows the rotation angle command value is sufficiently maintained. Further, it is possible to both improve the driver's steering feel and achieve advanced driver assistance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
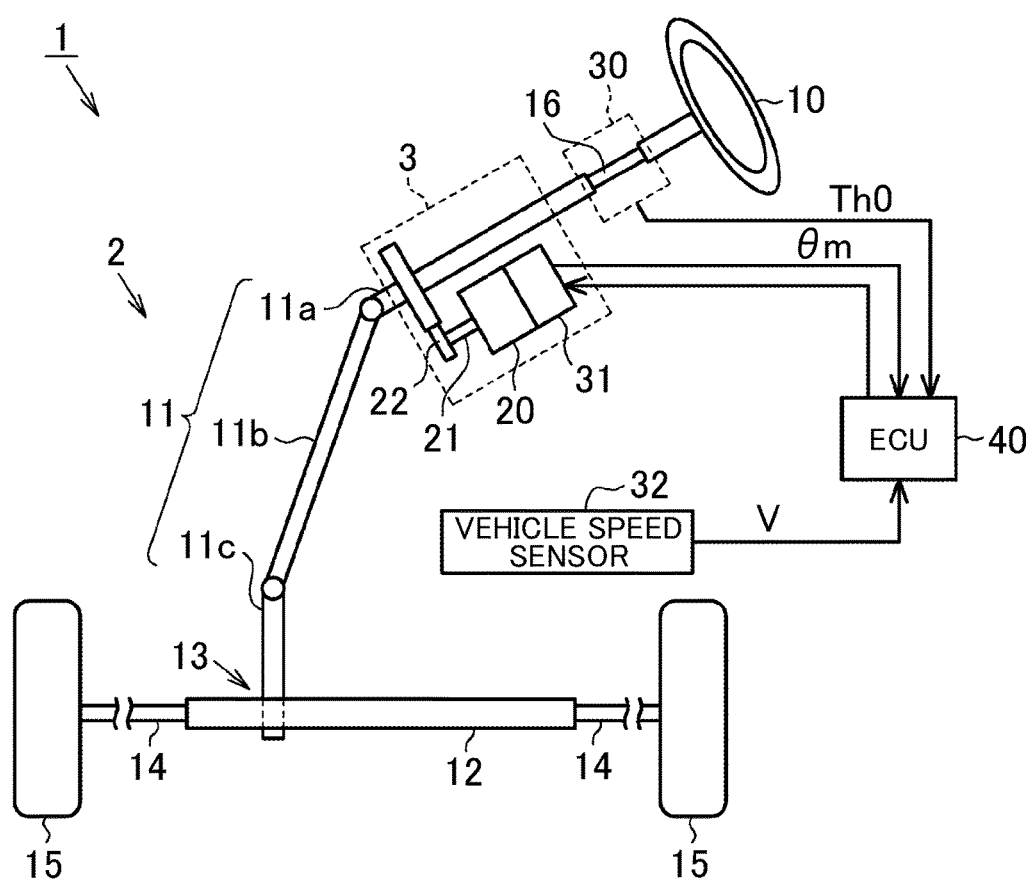
FIG. 1 is a schematic diagram of a configuration of an electric power steering system (EPS)

Hereinafter, description will be provided on an embodiment in which a steering control system according to the invention is applied to a steering system. As illustrated in FIG. 1, an electric power steering system (EPS) 1 includes a steering mechanism 2, an assist mechanism 3, and an electronic control unit (ECU) 40. The steering mechanism 2 steers steered wheels 15 based on a driver's operation of a steering wheel 10. The assist mechanism 3 assists a driver's steering operation. The ECU 40 controls the assist mechanism 3.

The steering mechanism 2 includes the steering wheel 10 and a steering shaft 11 that rotates together with the steering wheel 10 in an integrated manner. A column shaft 11a, an intermediate shaft 11b, and a pinion shaft 11c constitute the steering shaft 11. The column shaft 11a is coupled to the steering wheel 10. The intermediate shaft 11b is coupled to a lower end of the column shaft 11a. The pinion shaft 11c is coupled to a lower end of the intermediate shaft 11b. A lower end of the pinion shaft 11c is coupled to a rack shaft 12 via a rack-and-pinion mechanism 13. The rack-and-pinion mechanism 13 includes a pinion gear provided at a distal end of the pinion shaft 11c, and a rack formed on the rack shaft 12. With the steering mechanism 2 configured as described above, the rotary motion of the steering shaft 11 is converted into a reciprocating linear motion of the rack shaft 12 in the axial direction (lateral direction in FIG. 1) via the rack-and-pinion mechanism 13. The reciprocating linear motion is transmitted to the right and left steered wheels 15 via tie rods 14 coupled to respective ends of the rack shaft 12. Consequently, the steered angle of the steered wheels 15 is varied.

The assist mechanism 3 includes a motor 20 that is a source of an assist force. A rotary shaft 21 of the motor 20 is coupled to the column shaft 11a via a speed-reduction mechanism 22. The speed-reduction mechanism 22 reduces the speed of rotation received from the motor 20, and transmits a rotative force after the speed reduction to the column shaft 11a. That is, the rotative force (torque) generated by the motor 20 is applied to the steering shaft 11 as an assist force, thereby assisting the driver's steering operation. As the motor 20, for example, a three-phase brushless motor that rotates based on three-phase (U, V, W) driving electric power is used.

The ECU 40 controls the motor 20 based on detection results from various sensors provided in a vehicle. Examples of the various sensors include a torque sensor 30, a rotation angle sensor 31, and a vehicle speed sensor 32. The column shaft 11a is provided with a torsion bar 16. The torque sensor 30 is provided on the column shaft 11a. The motor 20 is provided with the rotation angle sensor 31. The torque sensor 30 detects a steering torque (torque signal) Th0 applied to the steering shaft 11, based on torsion between a portion of the column shaft 11a, which is positioned above the torsion bar 16, and a portion of the column shaft 11a, which is positioned below the torsion bar 16. The torsion is generated through the driver's steering operation. The rotation angle sensor 31 detects a rotation angle θm of the rotary shaft 21. The vehicle speed sensor 32 detects a vehicle speed V that is a traveling speed of the vehicle. The ECU 40 sets a target assist force based on the outputs from the sensors, and controls electric currents to be supplied to the motor 20 such that an actual assist force coincides with the target assist force.

Figure 2:
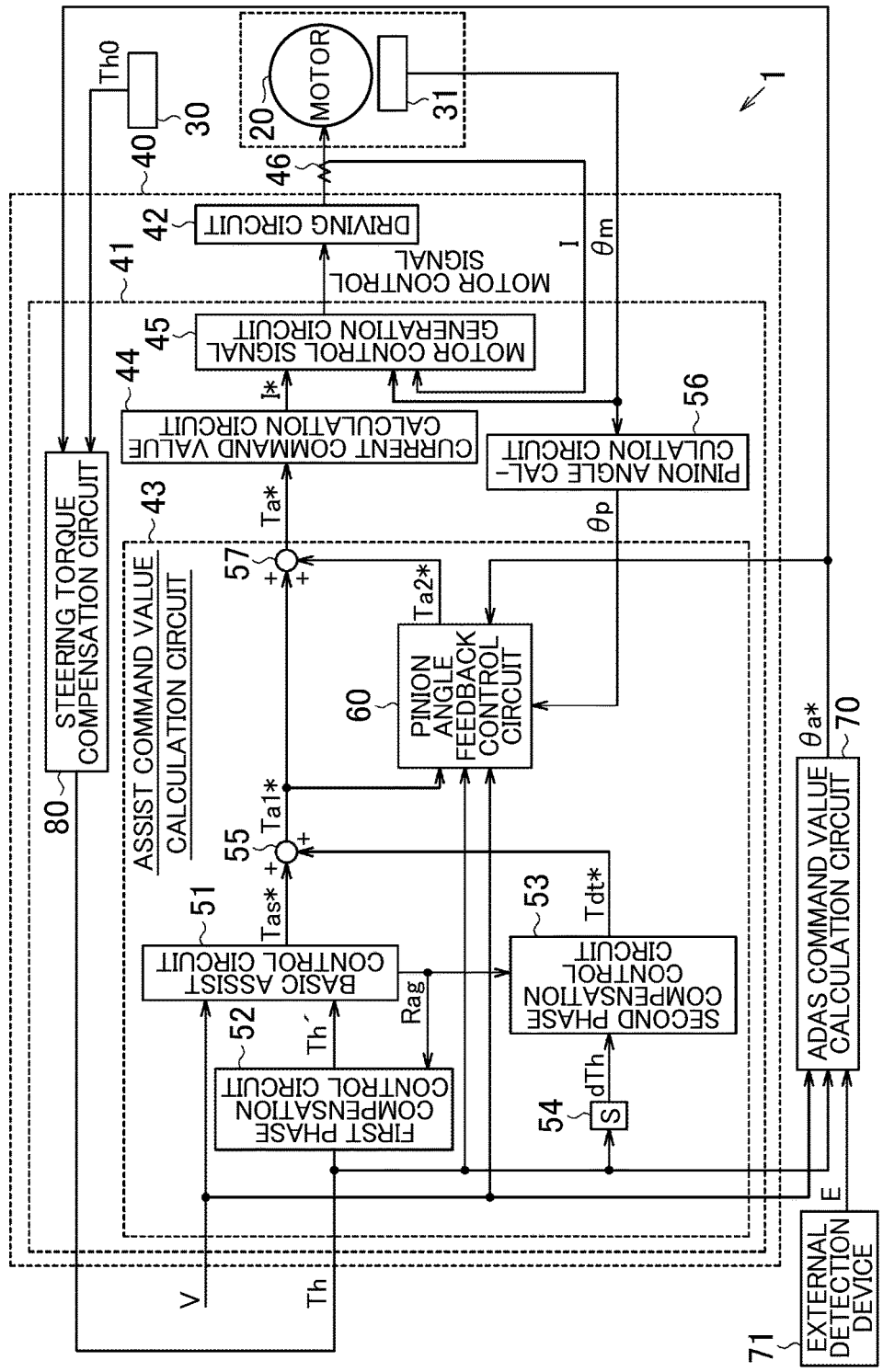
FIG. 2 is a block diagram illustrating control executed in the EPS in the present embodiment.

Next, the configuration of the ECU 40 will be described in detail. As illustrated in FIG. 2, the ECU 40 includes a microcomputer 41 and a driving circuit 42. The microcomputer 41 outputs a motor control signal to the driving circuit 42. The driving circuit 42 supplies driving electric power to the motor 20 based on the motor control signal.

Control blocks described below are implemented by computer programs executed by the microcomputer 41. The microcomputer 41 detects various state variables with a predetermined sampling period, and executes a calculation process described in each of the following control blocks with a predetermined period. In this way, the microcomputer 41 generates a motor control signal.

Specifically, the microcomputer 41 in the present embodiment includes an assist command value calculation circuit 43 and a current command value calculation circuit 44. The assist command value calculation circuit 43 calculates an assist command value Ta* corresponding to an assist torque to be generated by the motor 20, that is, a target assist force, based on the steering torque Th0 and the vehicle speed V. The current command value calculation circuit 44 calculates a current command value I* corresponding to the assist command value Ta*. The microcomputer 41 further includes a motor control signal generation circuit 45. The motor control signal generation circuit 45 generates a motor control signal to be output to the driving circuit 42 by executing current feedback control based on a current deviation dI (dI=I*−I) such that an actual current value I follows the current command value I*.

Specifically, the current command value calculation circuit 44 in the present embodiment calculates a q-axis current command value for a d-q coordinate system as the current command value I* (note that, a d-axis current command value is zero). The motor control signal generation circuit 45 receives, in addition to the current command value I*, three phase current values (Iu, Iv, Iw) detected by a current sensor 46 as the actual current value I, and a rotation angle θm detected by the rotation angle sensor 31. The motor control signal generation circuit 45 maps the phase current values into d-q coordinates as rotational coordinates based on the rotation angle θm, and executes current feedback control in the d-q coordinate system. In this way, the motor control signal is generated.

Next, a method of calculation executed by the assist command value calculation circuit 43 in the present embodiment will be described. As illustrated in FIG. 2, the assist command value calculation circuit 43 includes a basic assist control circuit 51 that calculates a basic assist controlled variable Tas* as a basic component of the assist command value Ta*. The assist command value calculation circuit 43 further includes a first phase compensation control circuit 52 that retards (advances) a phase of a steering torque Th0 detected by the torque sensor 30. The basic assist control circuit 51 calculates the basic assist controlled variable Tas* as a basic component of the assist command value Ta*, based on the vehicle speed V and a steering torque Th' obtained through the phase compensation executed by the first phase compensation control circuit 52. The basic assist control circuit 51 is an example of a first calculation circuit.

Figure 3:
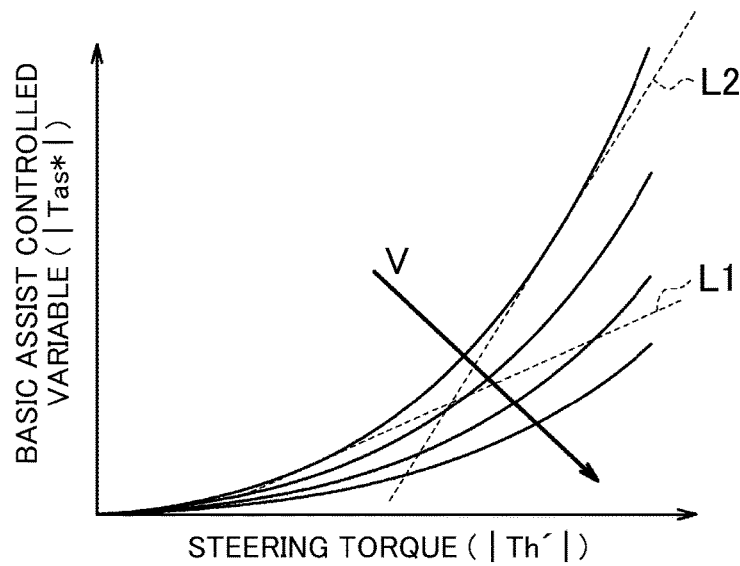
FIG. 3 is a graph schematically illustrating basic assist control calculation and assist gradients.

Specifically, as illustrated in FIG. 3, the basic assist control circuit 51 calculates the basic assist controlled variable Tas* in such a manner that the calculated basic assist controlled variable Tas* has a larger absolute value as the absolute value of the received steering torque Th' is larger and the vehicle speed V is lower. The basic assist control circuit 51 is designed to calculate the basic assist controlled variable Tas* such that an assist gradient Rag is higher as the steering torque Th' is larger. The assist gradient Rag is a rate of variation in the basic assist controlled variable Tas* with respect to a certain variation in the steering torque Th' (e.g., inclinations of tangents L1, L2).

As illustrated in FIG. 2, the basic assist control circuit 51 in the present embodiment outputs the assist gradient Rag corresponding to the steering torque Th' (and the vehicle speed V) to the first phase compensation control circuit 52 and a second phase compensation control circuit 53. The first phase compensation control circuit 52 varies characteristics (e.g., a filter factor) of the phase compensation control, based on the received assist gradient Rag.

Figure 4:
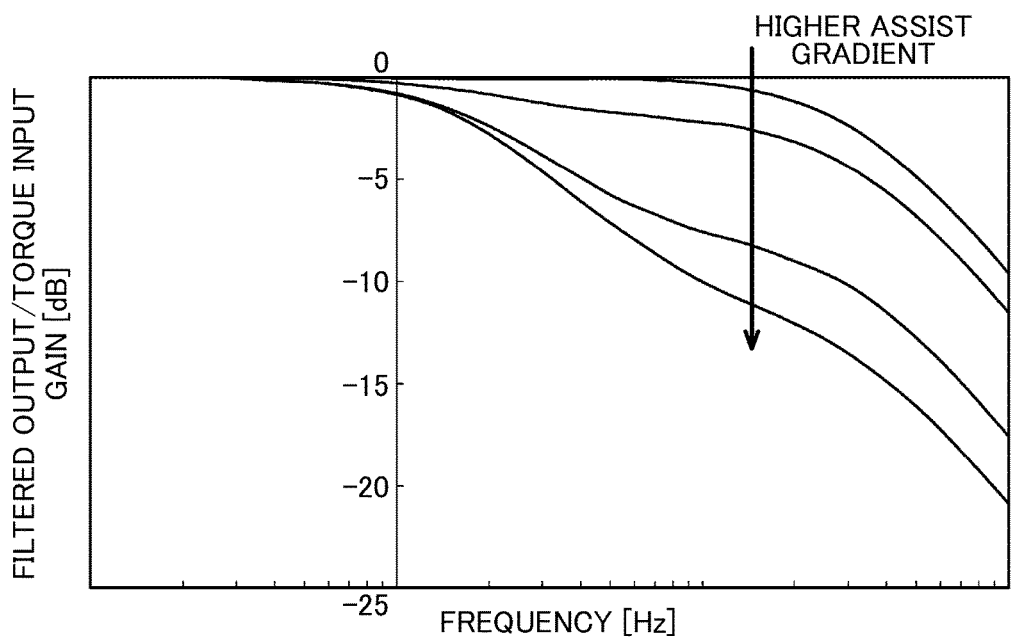
FIG. 4 is a graph illustrating a manner of phase compensation control based on the assist gradients.

Specifically, as illustrated in FIG. 4, the first phase compensation control circuit 52 varies the characteristics of phase compensation such that the phase of the steering torque Th' after the phase compensation is retarded (a gain is decreased) as the assist gradient Rag becomes higher. Further, in the present embodiment, the current feedback control executed by the motor control signal generation circuit 45 is designed such that the responsiveness of the current control is enhanced to obtain a favorable steering feel, while generation of vibrations is suppressed to achieve sufficient stability of the control.

As illustrated in FIG. 2, the assist command value calculation circuit 43 includes the second phase compensation control circuit 53 that calculates a system stabilization controlled variable Tdt* as a compensation component based on a received derivative value of the received steering torque Th (torque derivative value dTh). The second phase compensation control circuit 53 calculates the system stabilization controlled variable Tdt* based on the torque derivative value dTh and the assist gradient Rag. A differentiator 54 calculates the torque derivative value dTh by differentiating the received steering torque Th.

Figure 5:
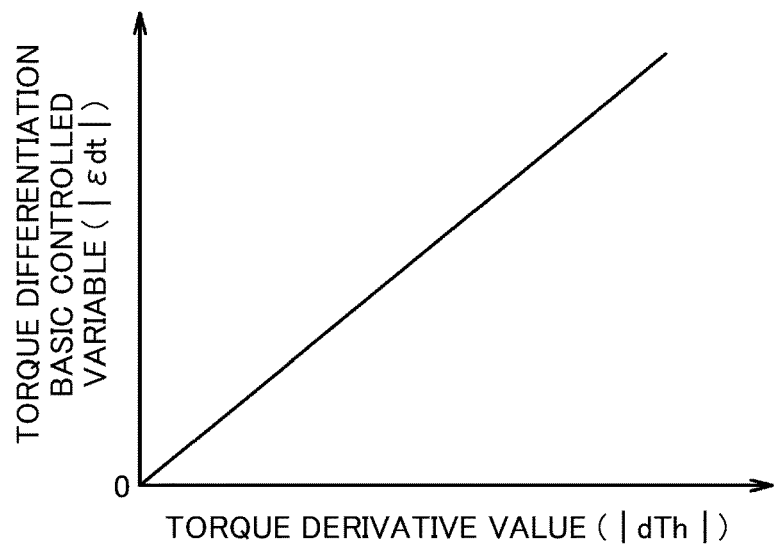
FIG. 5 is a graph illustrating a relationship between a torque derivative value and a torque differentiation basic controlled variable.
Figure 6:
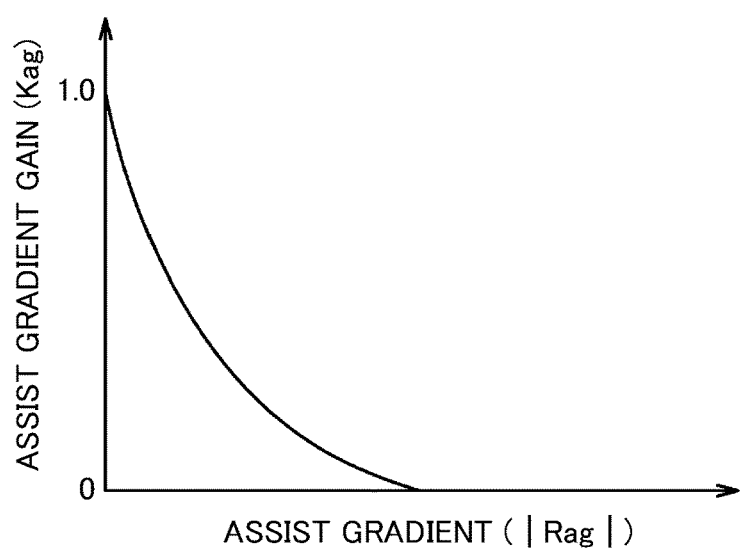
FIG. 6 is a graph illustrating a relationship between an assist gradient and an assist gradient gain.

Specifically, as illustrated in an example in FIG. 5, the second phase compensation control circuit 53 calculates a torque differentiation basic controlled variable εdt such that the calculated torque differentiation basic controlled variable cdt has a larger absolute value as the absolute value of the torque derivative value dTh is larger. Further, as illustrated in an example in FIG. 6, based on the assist gradient Rag input into the second phase compensation control circuit 53, the second phase compensation control circuit 53 calculates an assist gradient gain Kag such that the value of the assist gradient gain Kag becomes smaller as the absolute value of the assist gradient Rag is larger. The assist gradient gain Kag is a value that is set to be within a range from zero to 1.2 so as to be inversely proportional to the assist gradient Rag. The second phase compensation control circuit 53 multiplies the torque differentiation basic controlled variable cdt by the assist gradient gain Kag, and then outputs the value obtained through the multiplication, as the system stabilization controlled variable Tdt*. That is, the system stabilization controlled variable Tdt* can be expressed by Equation (1) using the torque differentiation basic controlled variable cdt and the assist gradient gain Kag.

$$Tdt^* = \varepsilon dt \times Kag \quad (1)$$

As illustrated in FIG. 2, an adder 55 receives the basic assist controlled variable Tas* calculated by the basic assist control circuit 51 and the system stabilization controlled variable Tdt* calculated by the second phase compensation control circuit 53. The assist command value calculation circuit 43 calculates a first assist component Ta1* based on a value obtained through the addition of the basic assist controlled variable Tas* and the system stabilization controlled variable Tdt*.

The microcomputer 41 includes a pinion angle calculation circuit 56 that calculates, based on the rotation angle θm, a rotation angle (pinion angle θp) of the pinion shaft 11c (see FIG. 1) positioned closer to the steered wheels 15 than the torsion bar 16. In the present embodiment, the pinion angle θp is used as a rotation angle (steering angle) of a rotary shaft, which can be converted into a steered angle of the steered wheels 15. However, such a rotation angle (steering angle) is not limited to the pinion angle θp.

The assist command value calculation circuit 43 includes a pinion angle feedback control circuit 60 that calculates a second assist component Ta2* by executing angle feedback control based on the pinion angle θp. The pinion angle feedback control circuit 60 is an example of a second calculation circuit.

Figure 7:
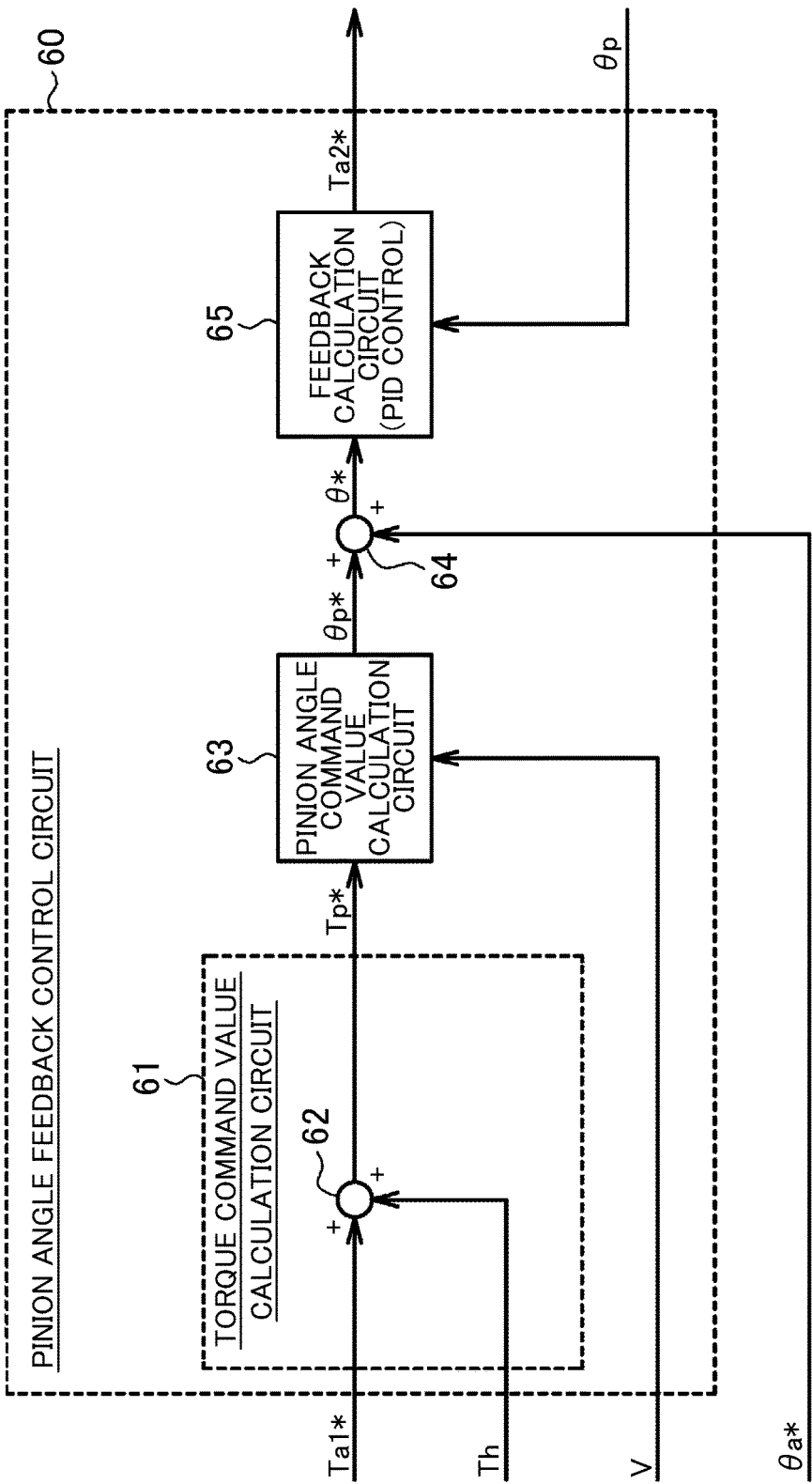
FIG. 7 is a schematic diagram of a configuration of a pinion angle feedback control circuit.

As illustrated in FIG. 7, the first assist component Ta1* and the steering torque Th are input into the pinion angle feedback control circuit 60. The pinion angle feedback control circuit 60 includes a torque command value calculation circuit 61 that calculates, based on the above-described state variables, a torque command value Tp* corresponding to an input torque transmitted to the pinion shaft 11c. The torque command value calculation circuit 61 includes an adder 62 that calculates the torque command value Tp* by adding together the first assist component Ta1* and the steering torque Th.

The pinion angle feedback control circuit 60 includes a pinion angle command value calculation circuit 63 that calculates, based on the torque command value Tp*, a pinion angle command value θp* as a rotation angle command value for a rotary shaft that can be converted into the steered angle of the steered wheels 15. The pinion angle command value calculation circuit 63 calculates the pinion angle command value θp* based on an ideal model (input torque-rotation angle model) for the pinion shaft 11c that rotates in response to the input torque indicated by the torque command value Tp*. That is, the input torque-rotation angle model is expressed by a spring term based on the rotation angle (pinion angle command value θp*) of the pinion shaft 11c, a viscous term based on a rotation angular velocity (pinion angular velocity) of the pinion shaft 11c, and an inertial term based on a value obtained by subtracting, from the input torque (torque command value Tp*), a spring component and a viscous component that are respectively control outputs of the spring term and the viscous term. The pinion angle command value calculation circuit 63 includes a filter that calculates various compensation values based on the vehicle speed V and the command values for the above-described dimensions (angle, speed, and angular velocity). The pinion angle command value calculation circuit 63 calculates the pinion angle command value θp* obtained through compensation based on the compensation values.

As illustrated in FIG. 2, the ECU 40 receives an ADAS command angle θa* from an ADAS command value calculation circuit 70 provided outside the ECU 40. The ADAS command angle θa* is a command value used to execute ADAS control. The ADAS command value calculation circuit 70 calculates the ADAS command angle θa* based on the steering torque Th, the vehicle speed V, and external information E obtained from an external detection device 71. As the external detection device 71, for example, a camera is used. The external detection device 71 detects the external information E including the information about an environment surrounding the vehicle.

As illustrated in FIG. 7, the pinion angle feedback control circuit 60 includes an adder 64 that calculates a final pinion angle command value θ* by adding the ADAS command angle θa* calculated by the ADAS command value calculation circuit 70 to the pinion angle command value θp* calculated by the pinion angle command value calculation circuit 63. That is, the ADAS command angle θa* is added to the pinion angle command value θp* to obtain the final pinion angle command value θ* in which the ADAS command angle θa* has been reflected in the pinion angle command value θp* (in which the ADAS command angle θa* is taken into account).

The final pinion angle command value θ* calculated by the adder 64 is input into a feedback calculation circuit 65 along with the pinion angle θp detected by the pinion angle calculation circuit 56 as an actual rotation angle. The feedback calculation circuit 65 generates the second assist component Ta2* by executing angle feedback control based on a deviation between the final pinion angle command value θ* and the pinion angle θp. As the feedback control, for example, proportional-integral-derivative control (PID control) is executed.

As illustrated in FIG. 2, the second assist component Ta2* calculated by the pinion angle feedback control circuit 60 is input into an adder 57 along with the first assist component Ta1* calculated by the adder 55. The adder 57 outputs the assist command value Ta* based on the sum of the first assist component Ta1* and the second assist component Ta2*.

The microcomputer 41 includes a steering torque compensation circuit 80 that receives the ADAS command angle θa* calculated by the ADAS command value calculation circuit 70 and the steering torque Th0 detected by the torque sensor 30. Based on the ADAS command angle θa* and the steering torque Th0, the steering torque compensation circuit 80 calculates, with a predetermined calculation period, the steering torque to be input into the assist command value calculation circuit 43 while taking into account a steering torque that is generated due to a variation in the pinion angle θp associated with the ADAS control. That is, the ADAS command angle θa* calculated in the immediately preceding calculation period is used to calculate the steering torque Th to be used in the calculation executed by the assist command value calculation circuit 43 in the present calculation period. Examples of the ADAS control include lane keeping assist control. The steering torque compensation circuit 80 is an example of a torque signal correction circuit.

Figure 8:
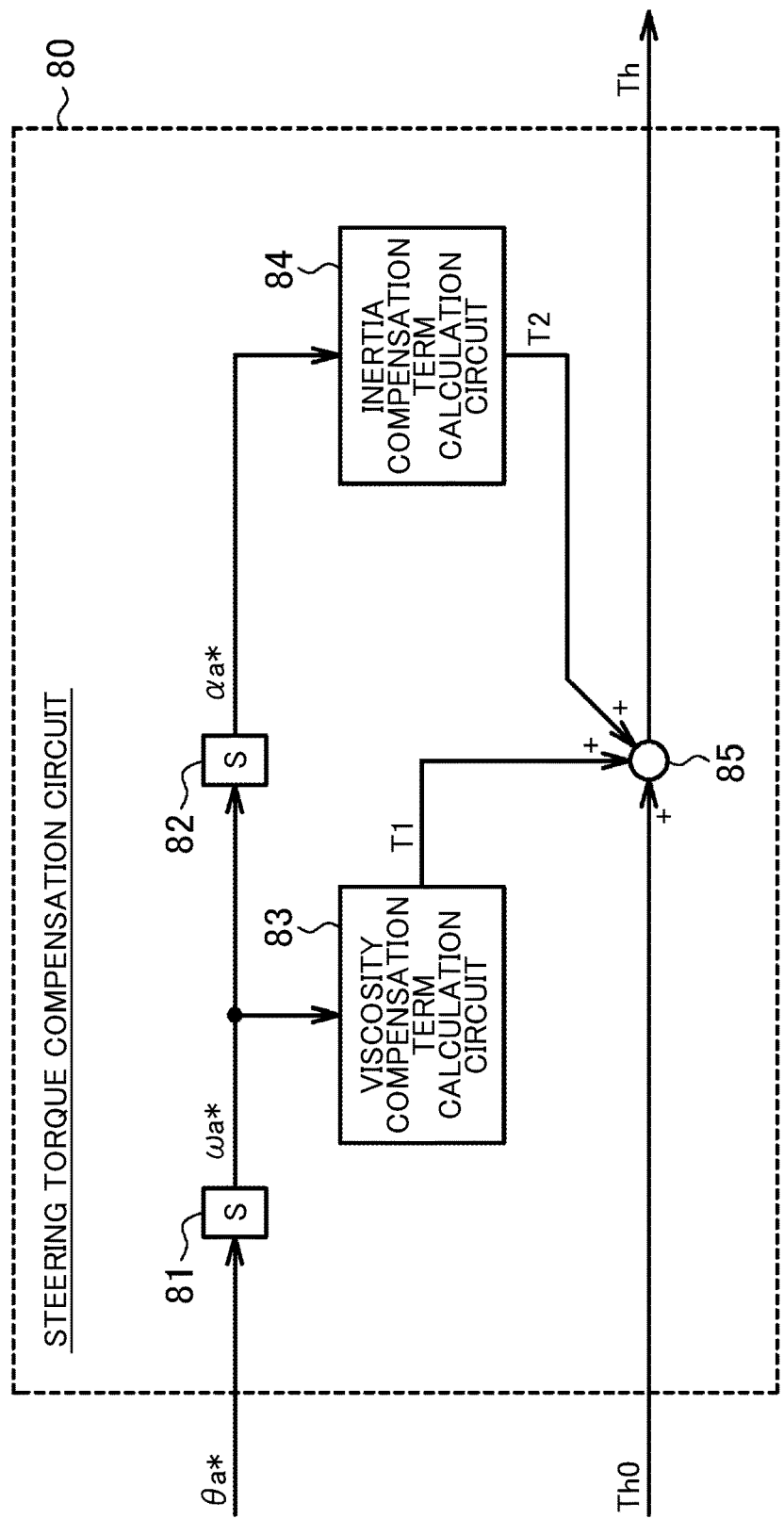
FIG. 8 is a schematic diagram of a configuration of a steering torque compensation circuit.

As illustrated in FIG. 8, the steering torque compensation circuit 80 includes a differentiator 81 that differentiates the received ADAS command angle θa* to obtain an ADAS command angular velocity ωa* (a first-order derivative value of the ADAS command angle θa* with respect to time). The steering torque compensation circuit 80 further includes a differentiator 82 that differentiates the received ADAS command angular velocity ωa* to obtain an ADAS command angular acceleration αa* (a second-order derivative value of the ADAS command angle θa* with respect to time).

The steering torque compensation circuit 80 includes a viscosity compensation term calculation circuit 83 that calculates a viscosity compensation term T1 by multiplying the ADAS command angular velocity ωa* by a viscosity coefficient. The viscosity coefficient is determined by, for example, a viscosity related to the rotation of the steering wheel 10 and the steering shaft 11.

The steering torque compensation circuit 80 further includes an inertia compensation term calculation circuit 84 that calculates an inertia compensation term T2 by multiplying the ADAS command angular acceleration αa* by an inertia coefficient. The inertia coefficient is determined by, for example, an inertia related to the rotation of the steering wheel 10 and the steering shaft 11.

The steering torque compensation circuit 80 further includes an adder 85 that calculates the steering torque Th by adding together the steering torque Th0 received from the torque sensor 30, the viscosity compensation term T1 received from the viscosity compensation term calculation circuit 83, and the inertia compensation term T2 received from the inertia compensation term calculation circuit 84. That is, the adder 85 calculates the steering torque Th by Equation (2) using the viscosity compensation term T1 and the inertia compensation term T2.

$$Th = Th0 + T1 + T2 \quad (2)$$

The viscosity compensation term T1 and the inertia compensation term T2 each have one of a positive sign and a negative sign depending on the direction of the steering torque Th0. That is, the viscosity compensation term T1 and the inertia compensation term T2 are added to the steering torque Th0 so as to reduce (cancel out) the viscosity and inertia components that are included in the steering torque Th0. Thus, even when the pinion angle θp is varied through the ADAS control, the assist command value calculation circuit 43 receives the steering torque Th obtained after the steering torque generated due to the inertia and viscosity of, for example, the steering wheel 10 is reduced (canceled out).

Next, advantageous effects of the present embodiment will be described.

(1) The column shaft 11a is provided with the torsion bar 16. Thus, when the pinion angle θp is varied through the ADAS control, the rotation angle of the column shaft 11a varies between a portion of the column shaft 11a, which is positioned above the upper portion of the torsion bar 16, and a portion of the column shaft 11a, which is positioned below the lower portion of the torsion bar 16. This is because the portion of the column shaft 11a, which is positioned above the torsion bar 16, is influenced by its viscosity. And this portion is also provided with the steering wheel 10, and this portion is also influenced by the inertia of the steering wheel 10. The viscosity and inertia are not only the above-described viscosity and the inertia of the steering wheel 10 itself. When a driver is holding the steering wheel 10, the viscosity and inertia may be increased by the driver's holding of the steering wheel 10. The assist command value calculation circuit 43 calculates the rotation angle command value (final pinion angle command value θ*) based on the steering torque including the steering torque generated due to the viscosity and inertia. This inhibits convergence of the angle feedback control for causing the rotation angle (pinion angle θp) to coincide with the final pinion angle command value θ* calculated by the feedback calculation circuit 65. As a result, the follow-up accuracy with which the pinion angle θp follows the final pinion angle command value θ* is reduced.

In view of this, in the present embodiment, the steering torque compensation circuit 80 is provided. Thus, the assist command value calculation circuit 43 receives the steering torque Th obtained through compensation executed with the viscosity and the inertia taken into account, and then calculates the first assist component Ta1* and the second assist component Ta2*. This is because, even when the pinion angle θp of the pinion shaft 11c is varied due to the ADAS command angle θa* output from the ADAS command value calculation circuit 70, the influence of the viscosity and inertia of the steering wheel 10 exerted on the steering torque is reduced. The assist command value calculation circuit 43 calculates the final pinion angle command value θ* based on the steering torque Th obtained after the steering torque due to the viscosity and inertia is reduced. This facilitates convergence of the angle feedback control for causing the pinion angle θp to coincide with the final pinion angle command value θ* executed by the feedback calculation circuit 65. As a result, the follow-up accuracy with which the pinion angle θp follows the final pinion angle command value θ* is sufficiently maintained. That is, the assist command value calculation circuit 43 is able to maintain the follow-up accuracy at the same level as that achieved when the ADAS control is not executed.

(2) The ADAS command value calculation circuit 70 also calculates the ADAS command angle θa* based on the steering torque Th obtained through compensation executed by the steering torque compensation circuit 80. This enables the ADAS command value calculation circuit 70 to calculate the ADAS command angle θa* by using only the steering torque generated through the driver's steering operation.

Figure 9:
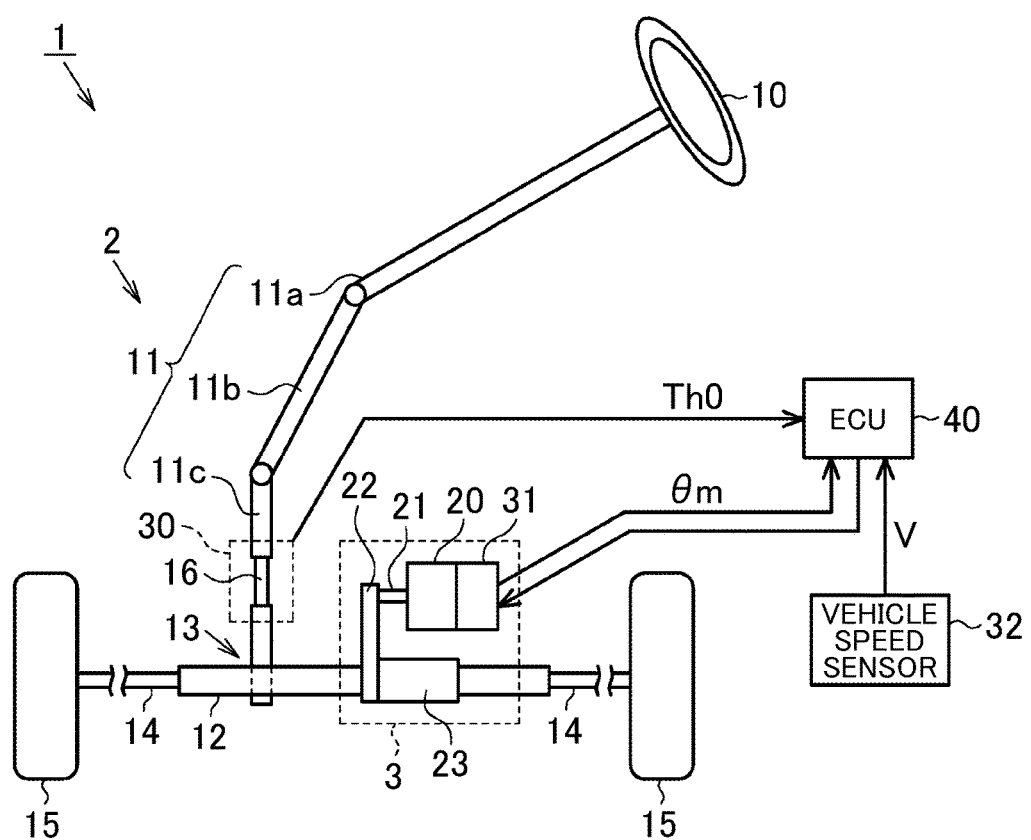
FIG. 9 is a schematic diagram of an EPS in another embodiment.

The present embodiment may be modified as follows. The following embodiments described below may be combined together unless the combination results in technical inconsistence. In the present embodiment, the invention is applied to the column assist EPS 1. However, the systems to which the invention is applied are not limited to this. For example, the invention may be applied to the steering systems in which an assist force generated by the motor 20 is applied to a portion on the downstream side (rack shaft 12 side) with respect to the torsion bar 16, such as a pinion assist EPS and a rack assist EPS. In a rack parallel (registered trade mark) EPS, which is a kind of a rack assist EPS and in which a motor shaft is disposed parallel to a rack, the pinion shaft 11c may be provided with the torsion bar 16 as illustrated in FIG. 9. In this case, the torque sensor 30 may detect a steering torque (torque signal) based on torsion between a portion of the pinion shaft 11c, which is coupled to an upper portion of the torsion bar 16, and a portion of the pinion shaft 11c, which is coupled to a lower portion of the torsion bar 16. In the rack parallel EPS, the rotative force generated by the motor 20 is converted into a force in an axial direction of the rack shaft 12 via the speed-reduction mechanism 22 and a ball screw mechanism 23. When the pinion shaft 11c is provided with the torsion bar 16, the distance between the steering wheel 10 and the torsion bar 16 is long and thus the mass of a portion of the steering mechanism 2, which is coupled to the upper portion (is positioned on the upstream side) of the torsion bar 16, becomes large. Consequently, the steering wheel 10 may have high inertia and high viscosity. Thus, compensation executed by the steering torque compensation circuit 80 in the present embodiment produces significantly advantageous effects.

In the present embodiment, the pinion angle θp, which is the rotation angle of the pinion shaft 11c, is used as the rotation angle of a rotary shaft that can be converted into the steered angle of the steered wheels. However, such a rotation angle is not limited to this. For example, the rotation angle of one of the intermediate shaft 11b and the rotary shaft 21 of the motor 20, which are positioned closer to the steered wheels 15 than the torsion bar 16, may be used.

In the present embodiment, the pinion angle calculation circuit 56 detects the pinion angle θp based on the rotation angle θm of the motor 20, which is detected by the rotation angle sensor 31. However, the method of detecting the pinion angle θp is not limited to this. For example, a rotation angle sensor that actually measures the pinion angle θp directly may be provided to actually measure the pinion angle θp.

In the present embodiment, the ECU 40 includes the first phase compensation control circuit 52 and the second phase compensation control circuit 53. However, the first phase compensation control circuit 52 and the second phase compensation control circuit 53 need not be provided. In this case, the steering torque Th is input directly into the basic assist control circuit 51. The first assist component Ta1* is equal to the basic assist controlled variable Tas*.

In the present embodiment, the steering torque compensation circuit 80 subjects the steering torque Th0 to compensation, based on the received ADAS command angle θa*. However, the method of compensation is not limited to this. For example, upon reception of the ADAS command angle θa*, the steering torque compensation circuit 80 may calculate the steering torque Th by adding or subtracting a predetermined value to or from the steering torque Th0.

In the present embodiment, the steering torque compensation circuit 80 calculates the steering torque Th while taking the viscosity and inertia into account. However, the method of calculating the steering torque Th is not limited to this. That is, the steering torque compensation circuit 80 may calculate the steering torque Th while taking only one of the viscosity and inertia into account. Instead of the viscosity and inertia, compensation amounts based on various other physical models, such as an elasticity, may be taken into account by the steering torque compensation circuit 80 to calculate the steering torque Th.

In the present embodiment, the ADAS command value calculation circuit 70 calculates the ADAS command angle θa* based on the steering torque Th, the vehicle speed V, and the external information E. However, the method of calculating the ADAS command angle θa* is not limited to this. For example, the ADAS command value calculation circuit 70 may calculate the ADAS command angle θa* without using the steering torque Th and the vehicle speed V (calculate the ADAS command angle θa* using only the external information E).

In the present embodiment, the torque sensor 30 detects the steering torque Th0 based on the torsion between the portion of the column shaft 11a, which is coupled to the top of the torsion bar 16, and the portion of the column shaft 11a, which is coupled to the bottom of the torsion bar 16. However, the method of detecting the steering torque TH0 is not limited to this. For example, a magnetostrictive torque sensor may be used to detect the steering torque Th0, without using the torsion bar 16.

In the present embodiment, the pinion angle feedback control circuit 60 calculates the second assist component Ta2* based on the steering torque Th (steering torque Th0) and the first assist component Ta1*. However, the method of calculating the second assist component Ta2* is not limited to this. For example, the pinion angle feedback control circuit 60 may calculate the second assist component Ta2* based on the steering torque Th.

In the present embodiment, the ADAS command value calculation circuit 70 calculates the ADAS command angle θa* as an ADAS command value. However, the method of obtaining the ADAS command angle θa* is not limited to this. For example, the ADAS command value calculation circuit 70 may calculate an ADAS command torque value. In this case, the assist command value calculation circuit 43 may receive the ADAS command torque value and convert the ADAS command torque value into the ADAS command angle θa*. Alternatively, the ADAS command value calculation circuit 70 may calculate an ADAS command current value. In this case, the assist command value calculation circuit 43 may receive the ADAS command current value and convert the ADAS command current value into the ADAS command angle θa*.

What is claimed is:

1. A steering control system configured to control a motor that assists or performs steering of a steering mechanism, the steering control system comprising:

a first calculation circuit that calculates a basic component of an assist force based on a torque signal detected based on torsion between an input side of a steering shaft and an output side of the steering shaft;

a second calculation circuit that calculates a compensation component for the basic component of the assist force, the compensation component being calculated by:
calculating a rotation angle command value for a rotary shaft based on the detected torque signal,
calculating a final rotation angle command value based on summing the calculated rotation angle command value and a second command value, the second command value being generated outside of the second calculation circuit for driver assistance based on at least the detected torque signal and information about an environment surrounding a host vehicle, and
performing angle feedback control based on a deviation between the calculated final rotation angle command value and a steering angle, the rotation angle command value being convertible into a steered angle of steered wheels;

a first command value generation adder that calculates a first command value by adding the compensation component to the basic component; and a torque signal correction circuit that: (i) derives a command angular velocity and a command angular acceleration from the second command value, (ii) calculates a viscosity compensation value by multiplying the derived command angular velocity by a predetermined viscosity coefficient based on rotation of the steering shaft, (iii) calculates an inertia compensation value by multiplying the derived command angular acceleration by a predetermined inertia coefficient based on the rotation of the steering shaft, and (iv) corrects the torque signal used to calculate the compensation component by increasing or decreasing the torque signal when the second command value is reflected in the compensation component based on the calculated viscosity compensation value and the calculated inertia compensation value, wherein
the motor applies the assist force based on the corrected torque signal to a steered shaft that steers the steered wheels in accordance with rotation of the steering shaft.

2. The steering control system according to claim 1, wherein, upon receiving the second command value, the torque signal correction circuit corrects the torque signal based on the second command value.

3. The steering control system according to claim 1, wherein, upon receiving the second command value, the torque signal correction circuit corrects the torque signal in accordance with a physical model.

4. The steering control system according to claim 1, wherein:
the second command value is an angle command value used for driver assistance, the angle command value serving as a target value of the steered angle of the steered wheels, and
the torque signal correction circuit includes an adder that adds together the torque signal, the viscosity compensation value, and the inertia compensation value.

5. The steering control system according to claim 1, wherein:
the second command value is an angle command value used for driver assistance, the angle command value serving as a target value of the steered angle of the steered wheels, and
the second calculation circuit calculates the final rotation angle command value by calculating the rotation angle command value for the rotary shaft based on a torque command value that is a sum of the torque signal and the basic component, and then adding the angle command value to the rotation angle command value, the rotation angle command value being convertible into the steered angle of the steered wheels.

6. The steering control system according to claim 1, wherein:
the motor applies the assist force to the steered shaft that steers the steered wheels by making a linear motion in accordance with rotation of the steering shaft, and
the torque signal is detected based on torsion between the input side that is a first side of a torsion bar and the output side that is a second side of the torsion bar, the torsion bar being provided in a pinion shaft that is a component of the steering shaft.

7. The steering control system according to claim 1, wherein:
the torque signal correction circuit receives the second command value and executes correction of the torque signal with a predetermined calculation period, and
when the second command value calculated in an immediately preceding calculation period is reflected in the first command value in a present calculation period or in a controlled variable that is based on the first command value and that is used to control the motor, the torque signal correction circuit corrects the torque signal used to calculate the first command value or the controlled variable that is based on the first command value and that is used to control the motor, in the present calculation period.

* * * * *